INVENTOR.
Charles S. Schaevitz
BY
ATTORNEY.

Feb. 10, 1959
C. S. SCHAEVITZ
2,872,740
DRYING MACHINE
Filed March 22, 1956
3 Sheets-Sheet 3
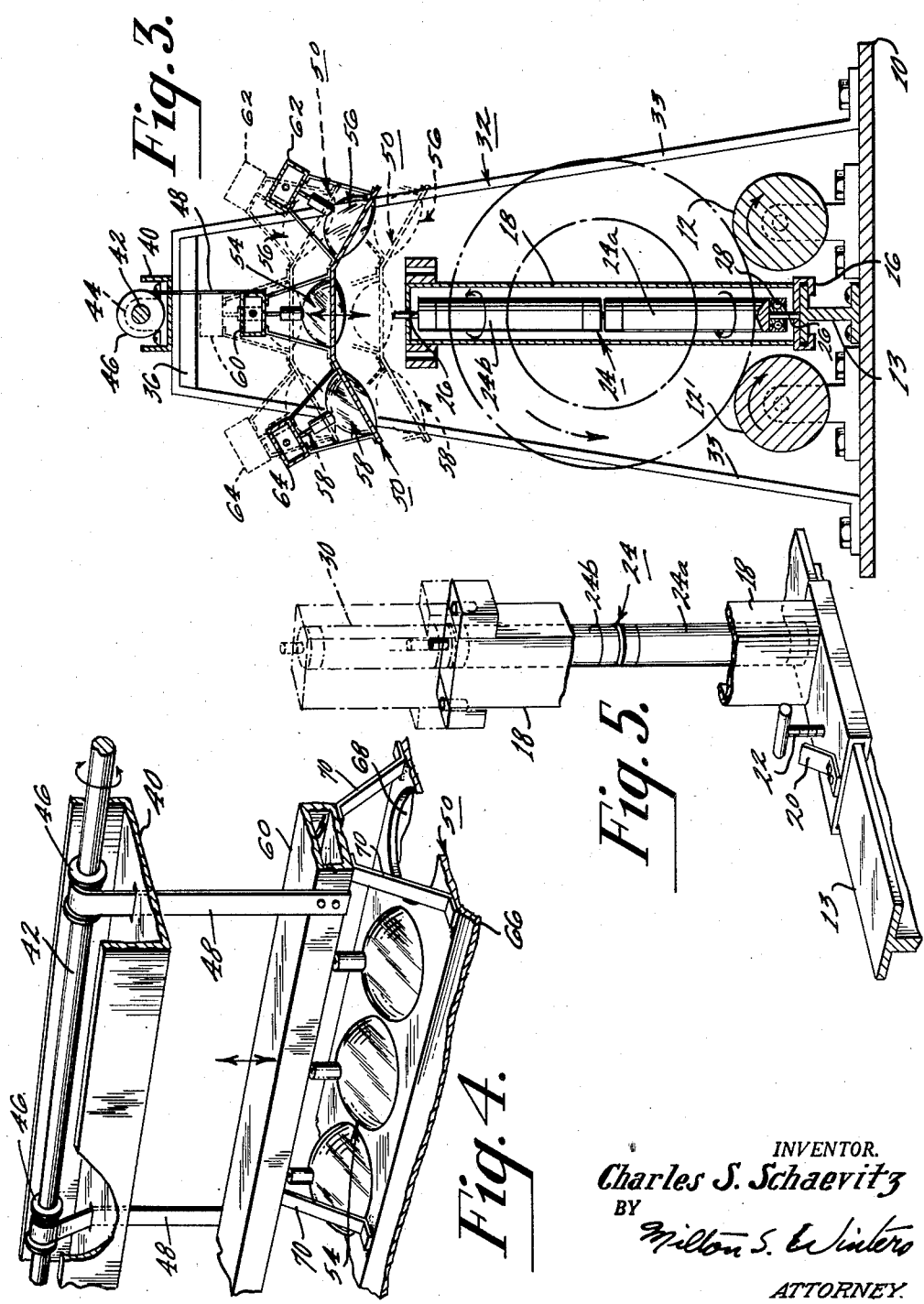
INVENTOR.
Charles S. Schaevitz
BY
Milton S. Winters
ATTORNEY.

United States Patent Office 2,872,740
Patented Feb. 10, 1959

2,872,740

DRYING MACHINE

Charles S. Schaevitz, Haddon Township, Camden County, N. J., assignor to Schaevitz Bros., Inc., a corporation of New Jersey Application March 22, 1956, Serial No. 573,271

6 Claims. (Cl. 34—68)

The present invention is related to drying machines, and particularly to drying machines of the type suited for drying such objects as automobile tires.

In the recapping of tires, it is desirable to have the tire well dried before a coating of rubber is applied to the tire. If the tire is not sufficiently dry when the new coating of rubber is applied, the moisture may be trapped in the tire fabric. Later, the heat applied during recapping of the tire may vaporize the moisture, which then may start separation of the cord plies of the tire fabric. The trapping of moisture is especially prevalent in present day tires which include modern manufactured filaments. Tires containing rayon and nylon filaments, for example, are especially liable to retain moisture and cause this separation of the plies. The tire cannot give proper service if such separation occurs.

It is an object of the present invention to provide a drying machine which is flexible in use for different sizes of tires, different quantities of tires, and affords at the same time ease of handling and operation.

It is another object of the present invention to provide a drying machine suitable for tires or tire-like objects which is improved in ease of operation and adjustment over prior drying machines for such objects.

Another object of the invention is to provide a drying machine for tires or tire-like objects which readily receives a set of these objects of any desired size, and at the same time has drying or heating elements which are easily spaced the proper distance for the particular sized object being dried, within the capacity of the machine.

A further object of the invention is to provide a drying machine for tire-like objects which is easily loaded, and yet may receive any number, within the limits of the machine, of the objects to be dried.

Another object of the invention is to provide a machine for drying tires or tire-like objects which not only may be loaded to any number of the objects to be dried, within the capacity of the machine, but in which the objects to be dried are entered into the machine for side by side rotation, and yet are secured against escape at the ends of the array without interfering with their free rotation.

According to the invention, the machine includes a pair of support rollers, one of which may be driven, to rotate the array of tire-like objects which rest on these rollers; and at least at one end of these support rollers, an end roller comprising two separately rotatable parts (and which end roller may therefore be termed a split roller), one part arranged to bear against the lower portion of the end objects and the other part bearing against the upper portion of the object, so that the object may rotate freely, and yet be secured at the end of the array from sidewise escape. As additional features, the split end roller on one end is mounted for adjustable positioning for larger or smaller arrays, that is, along the direction parallel to the axis of the tire-carrying rollers. As a further feature, this split end roller may be extended by the addition of removable sections, part by part, which permit larger or smaller tires to be used without interfering with the proper spacing of an overhanging array of heating means, such as heat lamps. Further, this array of heating means is also made adjustable in height. Consequently, an array of any number of tires of any desired size, within the machine capacity may be mounted in the machine, and the array of drying lamps or other heating elements positioned at the proper distance for even drying, with a considerable ease of handling and adjustment in operation of the machine.

The foregoing and other objects, advantages, and novel features of the invention will be more fully apparent from the following description, in which:

Fig. 3 is a transverse cross-sectional view of the machine of Fig. 1, taken along the line 3—3 of Fig. 2;

Fig. 4 is an enlarged view of a portion of the array of heat lamps, showing more clearly than the other views the manner in which they are supported; and Fig. 5 is a perspective view of an adjustably positioned split roller and the removable extension for it.

Figure 1:
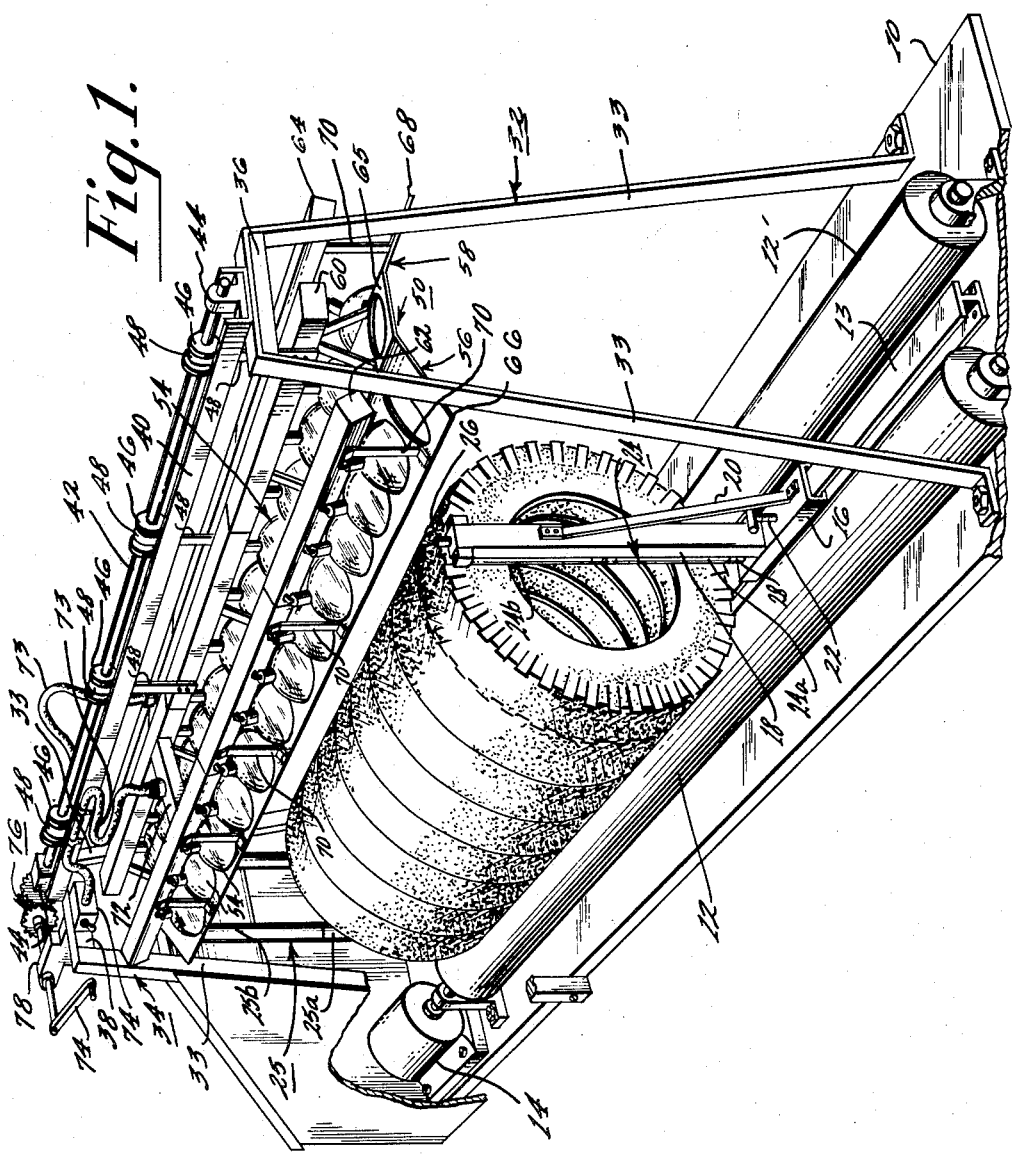
Fig. 1 is a perspective view of a tire drying machine embodying the invention.

With reference to the drawing, a base 10 carries a pair of support rollers 12, 12' spaced uniformly apart and suitably mounted in bearings on the base 10. One of the support rollers, the roller 12, is driven at one end by an electric motor through a suitable worm gearing enclosed in a housing 14. The axes of the rollers 12, 12' are parallel. An I-beam 13 is mounted between the support rollers 12, 12' with the longitudinal axis of the I-beam parallel to the axes of the rollers 12, 12'. The I-beam 13 is positioned well beneath the top surfaces of the support rollers 12, 12' and preferably is equidistant between them. The I-beam 13 is laid with its cross-bar vertical, and its side bars horizontal. A carriage plate 16 is mounted on a three-sided, vertical frame 18 stiffened by a brace 20. A set screw 22 is threaded into the carriage plate 16. The set screw 22 is provided with a handle for easy manual locking or releasing. A split roller 24 is mounted on the carriage plate 16, its axis normal to the plane including the axes of the support rollers 12, 12'. One form of construction may be by mounting a shaft 26 in the frame 18 between two horizontal small plates provided for the purpose at the top and bottom of the frame 18. On the saft 26 are driven two pairs of ball bearing races (one race 28 of which is shown in Fig. 3) spaced so that one pair supports a lower roller 24a and the other pair supports an upper roller 24b. The split roller 24 may be extended with additional sections. For example, as shown in Fig. 5, an additional section 30 is shown mounted above the upper roller 24b. This additional section may be made of a shaft or bar on which are mounted a pair of bearing races at each end, also mounted in a frame. At its bottom the frame of the additional section may have pins fitting into receptacles at the top of the frame 18. However, as an alternative (not shown) at its lower end the shaft of the additional section 30 may have a mounting extension of reduced diameter which is threaded to fit into a threaded bore at the upper end of the shaft 26 supporting the section 24a and 24b. In either event, the upper additional section 30 is free to rotate about the shaft extension.

At one end of the support rollers 12, 12' are mounted a pair of rollers 25 like the split roller 24, except that they are not adjustable along the axes of the support rollers 12, 12', but are fixed on the base 10. Also, the fixed rollers 25 may be split into two independently rotatable rollers, as 25a and 25b. Although three or more sections could be used, the split roller 25 is not moved under the lamps, and therefore one section at the bottom and a longer section at the top are all that are necessary. The split end rollers 25 may be made in the same fashion as the movable split end roller 24, that is, on a shaft are driven pairs of assemblies, each pair supporting a roller section. Because there are a spaced pair of the fixed end rollers 25, the tires do not rotate against them in a manner to drive the roller solely in the direction of its rotation. In other words, a component of the force due to the friction of the tires against the fixed rollers 25 is parallel to the axis of the roller rotation. Hence there is some friction against tire rotation at this end. However, these fixed rollers 25 are sufficiently near the tire center line that the tires are substantially free to rotate without frictional hinderance.

At opposite ends of the base 10 are erected a pair of similar support frames 32 and 34. Each support frame 32, 34 includes a pair of legs 33 inclined a little from the vertical towards each other at their tops and cross bars 36 and 38 respectively connecting the legs at their tops. The cross bars 36 and 38 support between them a channel iron 40. A support shaft 42 is disposed in the channel bar 40 with the support shaft axis parallel to the axes of the rollers 12, 12'. The support shaft 42 is suitably journalled in bearings 44 arranged at each end of the shaft. The bearings may be attached, as by bolting, to bind the channel bar 40 and the cross bars 36 together. Suitable pulleys 46 are mounted on the support shaft 42 on which are wound flexible metal tapes 48. From these tapes 48 is suspended a heat lamp assembly 50. Three lines of heat lamps, a central line of lamps 54, and side lines of lamps 56 and 58 on each side of the central line are provided. The central line of lamps 54 are supported from a conduit 60. The side lines of lamps 56 and 58 are supported from conduits 62 and 64 respectively. The ends of the tapes 48 are attached to the central conduit 60, with each successive tape being connected to a different side of the conduit, thereby affording even suspension. The conduits 60, 62 and 64, and a central facing sheet 65 of metal, and metallic sheets 66 and 68 which are winged from the central sheet, are fastened together with each other in the heat lamp assembly 50 by suitable means such as struts or braces 70. The conduits 60, 62 and 64 may also be joined by branching conduits 72. The lamps 54 of the central line are threaded into suitable receptacles in, or connected by cables as shown to, the central conduit 60, and depend therefrom to face directly down. The faces of the central line lamps 54 fit into suitable apertures in the central sheet 65. The side lamps 56 and 58 are threaded into suitable receptacles connected to the conduits 62 and 64 respectively, and the lamp faces fit into apertures in the respective sheets 66 and 68. The lamps include reflecting, focusing surfaces. The sheets 65, 66 and 68 may be constructed of one piece of metal with the wing sheets 66 and 68 bent at a slight angle from the horizontally disposed sheet 65, which is the same angle at which the side lines of lamps 56 and 58 face from the vertical.

Power is supplied the lamp receptacles by a flexible length of cable 73 leading from a junction box 74. The cable may enter the conduits at the branch conduits 72. The support shaft 42 may be driven manually by a crank 74 through a gearing 76. A ratchet 78 may lock the crank 74, the gearing 76, and the shaft 42 against motion in a direction to lower the assembly of lamps 50, except when the ratchet is deliberately released (raised).

Figure 2:
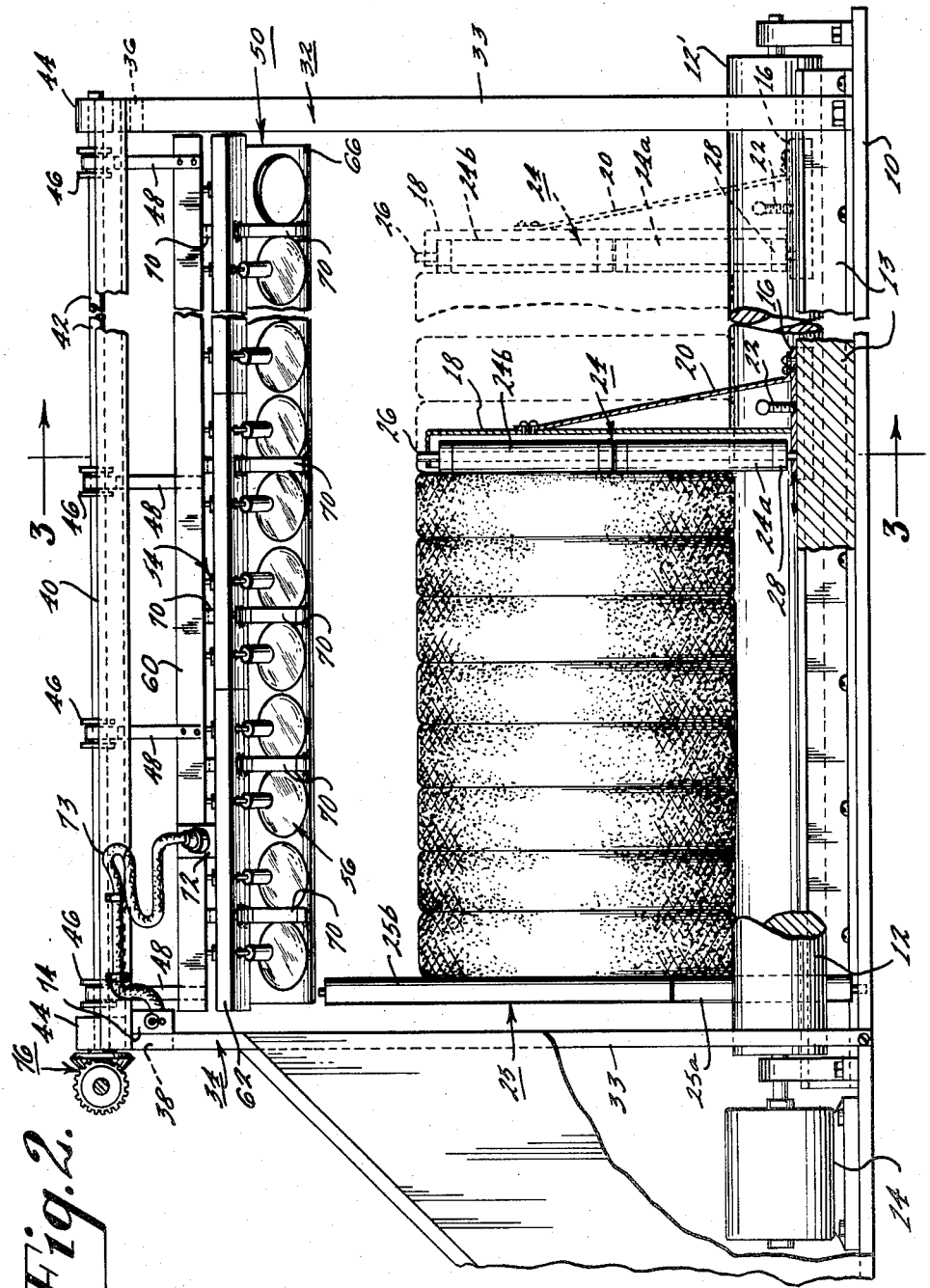
Fig. 2 is a plan view of the machine of Fig. 1.

In operation, a group of tires, preferably of about the same diameter, are selected for a run on the drying machine. The tires are placed side by side on the two support rollers 12, 12' as shown in Figs. 1 and 2. The tires are urged as closely as possible to the fixed end split rollers 25. The operator releases the set screw 22 and urges the carriage plate 16 and split roller 24 against the array of tires. If desired, the motor may now be turned on to briefly drive the drive roller 12. The tires then tend to ride vertically, and the carriage may be further loosened and urged again against the tires to hold them in closer alignment. Additional sections are added to the split roller 24 only if necessary to engage tires of larger diameter. The fewest possible sections are used, so that the drying lamps may now be brought to the proper position.

The operator now releases the ratchet 78 and holds it so that it does not drop back into place, and meanwhile turns the handle 74 until the lamps are in the proper position over the tires. Normally a clearance of about four inches is desired. If the lamps are brought too close, the drying may be uneven. If the lamps are too far away, the heat afforded may be inadequate for proper drying. The proper spacing depends, of course, upon the rating of the heat lamps, the focal length of their reflectors, and other factors. The angle of the reflectors and spacing of the lamps is selected so that all the lamps are at the same distance from the tires for the size of the tires most often employed. These dimensions are not critical. However, if it were not for the sectionalizing of the split roller 24, the end roller could not hold less than a full complement of tires and at the same time permit the lights to be brought within the proper distance of the tires. Also, the split rollers permit the tires to be held at each end, the split rollers exerting no serious friction against the rotation of the end tires.

After the drying lamps have been brought into proper position, the electrical power is applied. As a safety precaution, the idler roller 12' may be geared to a centrifugal switch, which by itself or through a relay, admits power to the lamps only when the idler roller 12' is driven. Such an arrangement protects against the possibility of one of the tires being caught in some fashion, or that the rollers 12 or 12' may bind, or that the split rollers 24, 25 may bind, causing one or more tires to burn.

The drying continues for a suitable period, dictated by experience, for the kind of tires being dried. After the tires have been dried for a sufficient length of time, the drying lamps are switched off, and the crank 74 is turned to raise the lamp assembly 50, so that clearance is afforded for removal of the tires from the machine. The set screw 22 is loosened, and the carriage 16 is withdrawn enough from the tires to permit them to be removed. A new set of tires may then be inserted.

Thus, there has been disclosed herein a drying machine especially suitable for drying tires. This machine is flexible in its use, in that it readily accommodates groups of tires of one size or another, and of any desired quantity within the capacity of the machine. The adjustably mounted split end roller affords an easy, convenient way of holding the group of tires to be dried, so that the tires cannot escape from the ends of the machine and yet permitting free rotation of these tires for even drying.

What is claimed is:

1. A drying machine for drying tire-like objects and comprising a pair of support rollers having parallel axes and spaced uniformly apart to receive said objects for rotation on said rollers and supporting said objects upon them, a first split roller at one end having two oppositely rotatable portions with aligned axes of rotation, the axes of rotation of said split roller being normal to the plane including those of said support rollers, a second split roller at the other end having two oppositely rotatable portions with aligned axes of rotation, the said aligned axes being normal to the said plane and parallel to those of said first split roller, said second split roller being mounted for adjustment along the direction of the axes of said support rollers, and a means for supplying drying heat mounted for adjustment at a desired distance from said pair of support rollers.

2. A drying machine for drying tire-like objects and comprising a pair of support rollers having parallel axes and spaced uniformly apart to receive said objects for rotation and to support the objects between and upon them, a beam having an axis parallel to those of said support rollers and located between and beneath the tops of said parallel rollers during operation, a carriage mounted on said beam and having means for locking said carriage on the beam at an adjustable position along the axis of the beam, a split roller carried by said carriage and having an axis normal to the plane which includes the two parallel support roller axes, and a means for supplying radiant drying heat mounted above said support rollers.

3. A drying machine for drying tire-like objects and comprising a pair of support rollers having parallel axes and spaced uniformly apart to receive said objects for rotation and to support the objects between and upon said rollers, a mounting beam having an axis parallel to those of said support rollers and located between and beneath the tops of said parallel rollers during operation, a carriage mounted on said beam and having means for locking said carriage on the beam at an adjustable position along said axis of said beam, a split roller carried by said carriage and having an axis normal to the plane which includes the two parallel support roller axes, at least one other split roller mounted adjacent one end of said pair of parallel axes support rollers.

4. A drying machine for drying tire-like objects and comprising a pair of support rollers having parallel axes and spaced uniformly apart to receive said objects for rotation and to support the objects between and upon them, a beam having an axis parallel to those of said support rollers and located between and beneath the tops of said parallel rollers during operation, a carriage mounted on said beam and having means for locking said carriage on the beam at an adjustable position along the axis of the beam, a split roller carried by said carriage and having an axis normal to the plane which includes the two parallel support roller axes, said split roller having means for mounting a further roller section as an extension in the direction of its own axis, and a means for supplying radiant drying heat mounted above said support rollers and adjustable in distance from said support rollers.

5. In a drying machine, the combination comprising a rotatable mounting for tire-like objects to be dried, said objects to be placed side by side for rotation in said mounting, a split roller mounted for adjustable positioning along the direction of the axis of said rotation for preventing escape of the said objects, said split roller comprising a rigid shaft, two pairs of bearing assemblies mounted on said shaft, and a pair of rollers a different one mounted on each different pair of said assemblies, a removable end section roller for extending the length of said split roller and comprising a second rigid shaft, a pair of bearing assemblies mounted on said second shaft, and a third roller mounted on said end section bearing assemblies, and means for engaging removably one end of one said shaft to one end of the other said shaft.

6. In a drying machine, the combination comprising a rotatable mounting for tire-like objects to be dried, said objects to be placed side by side for rotation on said mounting, a split end-roller mounted for adjustable positioning along the direction of the axis of said rotation for preventing escape of said objects, said end-roller comprising a rigid shaft having a free end, a pair of rollers, and means for mounting said pair of rollers on said shaft one above the other for free rotation about said shaft, a removable end section roller for extending the length of said end-roller and comprising a rigid shaft, and means for removably engaging the ends of said last-mentioned shaft with said free end of said first-mentioned shaft.

References Cited in the file of this patent

UNITED STATES PATENTS

| 1,700,697 | Draper | Jan. 29, 1929 |
| 2,315,124 | Luzius | Mar. 30, 1943 |
| 2,498,560 | Leeth | Feb. 21, 1950 |
| 2,504,947 | Grange | Apr. 18, 1950 |

FOREIGN PATENTS

| 333,150 | Italy | Dec. 20, 1935 |